US010371025B2

(12) United States Patent
Marthaler

(10) Patent No.: US 10,371,025 B2
(45) Date of Patent: Aug. 6, 2019

(54) LUBRICANT LEVEL CONTROL FOR LUBRICATED SYSTEMS

(71) Applicant: CUMMINS IP, INC., Columbus, IN (US)

(72) Inventor: Michael J. Marthaler, Columbus, IN (US)

(73) Assignee: Cummins IP, Inc., Columbus, IN (US)

( * ) Notice: Subject to any disclaimer, the term of this patent is extended or adjusted under 35 U.S.C. 154(b) by 137 days.

(21) Appl. No.: 15/712,801

(22) Filed: Sep. 22, 2017

(65) Prior Publication Data
US 2018/0010495 A1 Jan. 11, 2018

Related U.S. Application Data

(62) Division of application No. 14/065,098, filed on Oct. 28, 2013, now Pat. No. 9,784,150.

(51) Int. Cl.
F01M 11/06 (2006.01)
F01M 1/02 (2006.01)
F01D 25/18 (2006.01)
F16N 7/14 (2006.01)
F01M 5/02 (2006.01)
F16C 33/10 (2006.01)
F01M 9/10 (2006.01)

(52) U.S. Cl.
CPC ........... F01M 11/061 (2013.01); F01D 25/18 (2013.01); F01M 1/02 (2013.01); F01M 5/025 (2013.01); F16N 7/14 (2013.01); F01M 9/10 (2013.01); F16C 33/1025 (2013.01); Y10T 137/0379 (2015.04)

(58) Field of Classification Search
CPC ...... F01M 11/061; F01M 10/02; F01M 5/025; F01M 9/10; F01D 25/18; F16N 7/14
See application file for complete search history.

(56) References Cited

U.S. PATENT DOCUMENTS

| | | | |
|---|---|---|---|
| 2,964,132 | A | 12/1960 | Atkinson |
| 4,245,593 | A | 1/1981 | Stein |
| 5,180,034 | A | 1/1993 | Lopes |
| 5,884,601 | A | 3/1999 | Robinson |

(Continued)

OTHER PUBLICATIONS

International Search Report and Written Opinion of the International Searching Authority issued for PCT/US2014/051449, dated Jan. 8, 2015.

Primary Examiner — Syed O Hasan
(74) Attorney, Agent, or Firm — Foley & Lardner LLP

(57) ABSTRACT

Disclosed herein is a system includes a lubricated component and a lubricant pump that selectively provides lubricant to the lubricated component. The system also includes a lubricant source in lubricant providing communication with the lubricant pump. Additionally, the system includes a lubricant flow regulation device in lubricant receiving communication with the lubricated component and lubricant providing communication with the lubricant source. The lubricant flow regulation device is configured to drain lubricant from the lubricated component to the lubricant source based on when the lubricant pump provides lubricant to the lubricated component, and to prevent drainage of lubricant from the lubricated component to the lubricant source based on when the lubricant pump stops providing lubricant to the lubricated component.

9 Claims, 6 Drawing Sheets

(56) References Cited

U.S. PATENT DOCUMENTS

| | | | |
|---|---|---|---|
| 5,887,562 A * | 3/1999 | von Esebeck | F01M 1/12 |
| | | | 123/196 AB |
| 6,067,946 A | 5/2000 | Bunker | |
| 6,082,321 A * | 7/2000 | Kopec | F01M 1/16 |
| | | | 123/196 R |
| 6,230,680 B1 | 5/2001 | Pirone | |
| 2006/0054404 A1 * | 3/2006 | El-Ibiary | F16C 33/1085 |
| | | | 184/6 |
| 2006/0054406 A1 | 3/2006 | Delaloye | |
| 2008/0300746 A1 | 12/2008 | Dreier et al. | |
| 2009/0152051 A1 | 6/2009 | Glahn et al. | |

* cited by examiner

LUBRICANT LEVEL CONTROL FOR LUBRICATED SYSTEMS

CROSS-REFERENCE TO RELATED APPLICATIONS

This application is a divisional claiming the benefit of priority to U.S. patent application Ser. No. 14/065,098, filed on Oct. 28, 2013, entitled "Lubricant Level Control For Lubricated Systems," the entire disclosure of which is incorporated herein by reference.

FIELD

This disclosure relates generally to internal combustion engine systems, and more particularly to controlling the level of lubrication in lubricated systems and sub-systems of an internal combustion engine.

BACKGROUND

Lubrication of the moving components of an internal combustion engine is often important in the proper operation of the engine. Conventional internal combustion engines have several systems and sub-systems requiring lubrication for proper operation. For example, some conventional internal combustion engines include gear trains, fuel pumps, lubrication pumps, air compressors, valve systems, camshaft systems, and/or other components and systems that may utilize lubrication to reduce friction and parasitic losses during operation.

Many conventional internal combustion engines include a lubrication supply system with a source, such as an oil pan, and a pump. During operation of the internal combustion engine, the pump pressurizes lubrication from the lubricant source while supplying the pressurized lubrication to the various lubricated systems and sub-systems of the engine. Some lubrication systems, such as gear trains, receive pressured oil to lubricate the systems, while concurrently draining used lubrication from the systems back to the lubricant source to prevent undesirable amounts of lubrication from pooling within the systems. In certain systems, the pooling of pressurized oil during operation may lead to inefficiencies, including the degradation and failure of seals. Accordingly, bleeding lubrication out of the systems during operation of the engine may be desirable. Certain conventional systems do not regulate or control the flow of lubrication from the systems. Following operation of the engine, lubrication is allowed to continuously drain from the systems back to the lubrication source such that no lubrication is left pooled in the systems.

Because lubrication is substantially completely drained from the lubricated systems after shutting down or following operation of the internal combustion engine, lubrication must be supplied to the systems upon start-up or initializing operation of the engine. However, lubrication is also drained from the lubrication supply system while the engine is shut down. Upon start-up of the engine, the lubrication supply lines of the lubrication supply system are populated with lubrication via the pumping action of the pump before lubrication can be supplied to the lubricated systems. Populating the lubrication supply lines following start-up of the engine, particularly following a cold-start of the engine when the lubrication is most viscous, can significantly delay the introduction of lubrication into the lubrication system. The delay in the lubrication supply to the lubricated systems results in periods of unlubricated operation of the lubricated systems, which may cause an increase in the friction and parasitic losses of the engine.

SUMMARY

The subject matter of the present application has been developed in response to the present state of the art, and in particular, in response to the problems and needs in the art that have not yet been fully solved by currently available lubrication supply systems and lubricated systems for internal combustion engines. Accordingly, the subject matter of the present application has been developed to provide methods, systems, and apparatus for regulating lubrication into and out of a lubricated system of an internal combustion engine system that overcomes at least some shortcomings of the prior art.

According to one embodiment, a system includes a lubricated component and a lubricant pump that selectively provides lubricant to the lubricated component. The system also includes a lubricant source in lubricant providing communication with the lubricant pump. Additionally, the system includes a lubricant flow regulation device in lubricant receiving communication with the lubricated component and lubricant providing communication with the lubricant source. The lubricant flow regulation device is configured to drain lubricant from the lubricated component to the lubricant source based on when the lubricant pump provides lubricant to the lubricated component, and to prevent drainage of lubricant from the lubricated component to the lubricant source based on when the lubricant pump stops providing lubricant to the lubricated component.

In some implementations of the system, the lubricant flow regulation device is configured to drain lubricant from the lubricated component to the lubricant source approximately concurrently with the lubricant pump providing lubricant to the lubricated component, and to prevent drainage of lubricant from the lubricated component to the lubricant source approximately concurrently with the lubricant pump stopping the provision of lubricant to the lubricated component. According to certain implementations, the lubricant flow regulation device is configured to prevent drainage of lubricant from the lubricated component to the lubricant source before the lubricant pump stops providing lubricant to the lubricated component. In yet some implementations, the lubricant flow regulation device is configured to prevent drainage of lubricant from the lubricated component to the lubricant source after the lubricant pump stops providing lubricant to the lubricated component.

According to certain implementations of the system, the lubricant flow regulation device includes a pressure-regulated valve in lubricant receiving communication with the lubricant pump. The pressure-regulated valve can open to allow lubricant in the lubricated component to drain to the lubricant source and close to prevent lubricant in the lubricated component from draining into the lubricant source in response to a pressure of the lubricant received from the lubricant pump. The pressure-regulated valve may open in response to the pressure of the lubricant exceeding a threshold pressure, and close in response to the pressure of the lubricant dropping below the threshold pressure. The pressure-regulated valve can be integrated into the lubricated component.

In yet some implementations of the system, the pressure-regulated valve includes an interior channel with a first end fluidly coupled to the lubricant pump and a second end fluidly coupled to the lubricated component. The pressure-regulated valve further includes a return outlet fluidly coupled to the interior channel between the first and second ends.

Additionally, in certain implementations, the pressure-regulated valve includes a piston movable along the interior channel between an open position to open the valve and a closed position to close the valve. The piston can include a closed end and an at least partially open end, where the closed end forms a fluid seal between the first and second ends of the interior channel. The piston comprises at least one outlet aperture between the closed end and the at least partially open end. The outlet aperture is at least partially open to the return outlet when the piston is in the open position and closed to the return outlet when the piston is in the closed position. The piston may include a plurality of outlet apertures. The pressure-regulated valve can further include a biasing member positioned within the interior channel between the piston and the second end of the interior channel. The biasing member biases the piston into the closed position. In some implementations, a bias of the biasing member corresponds with a threshold pressure. The lubricant from the pump overcomes the bias of the biasing member to move the piston into the open position when a pressure of the lubricant from the pump reaches the threshold pressure.

According to some implementations of the system, the lubricant flow regulation device includes an electrically-controlled valve. The system can further include an internal combustion engine in lubricant receiving communication with the lubricant pump, and an electronic control module in electrical communication with the electrically-controlled valve. The electronic control module can open the valve in response to the engine starting and close the valve in response to the engine stopping. In certain implementations, the electronic control module opens the valve in response to a sensed pressure of the lubricant exiting the pump exceeding a threshold pressure.

In another embodiment, a system includes an internal combustion engine with a drive gear, and a clutch device operatively coupled to the drive gear. The system also includes an electric accessory drive operatively coupled to the clutch device via a driven gear of the electric accessory drive. The clutch device is selectively operable to mechanically couple the drive gear and the driven gear and mechanically decouple the drive gear and the driven gear. Additionally, the system includes a lubricant pump that is operable to supply lubricant to the internal combustion engine and the electric accessory drive to lubricate the drive gear and driven gear. The system also includes a pressure-regulated valve in lubricant receiving communication with the lubricant pump. Lubricant from the pump opens the pressure-regulated valve to drain lubricant from the electric accessory drive when a pressure of the lubricant meets a threshold pressure and closes the pressure-regulated valve to prevent drainage of lubricant from the electric accessory drive when the pressure of the lubricant does not meet the threshold pressure. According to some implementations, the system also includes a drain formed in the internal combustion engine, clutch device, and electric accessory drive. The drain fluidly couples the internal combustion engine, clutch device, and electric accessory drive at a location above the pressure-regulated valve.

According to yet another embodiment, a method for lubricating a lubricated component includes pumping a first portion of lubricant into a lubricated component, and pumping a second portion of the lubricant into a pressure-regulated valve to open the pressure-regulated valve. The pressure-regulated valve is fluidly coupled to the lubricated component. Additionally, the method includes draining lubricant from the lubricated component through the opened pressure-regulated valve.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
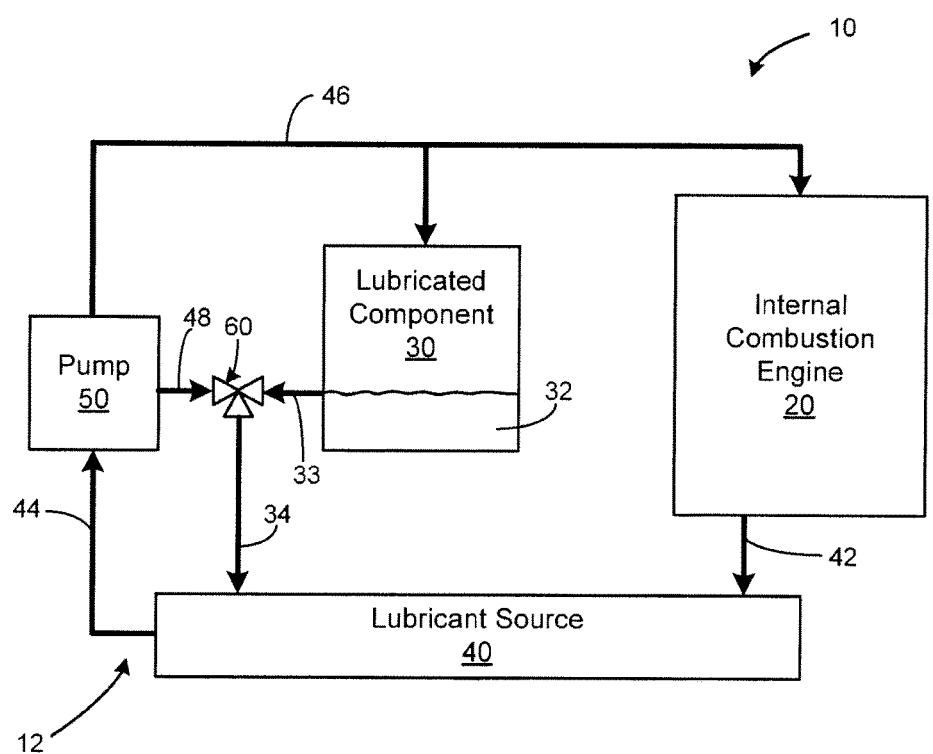
FIG. 1 is a schematic block diagram of an internal combustion engine system having an internal combustion engine, a geared component, and a lubrication supply system with a lubricant-driven valve in accordance with one representative embodiment.
Figure 3:
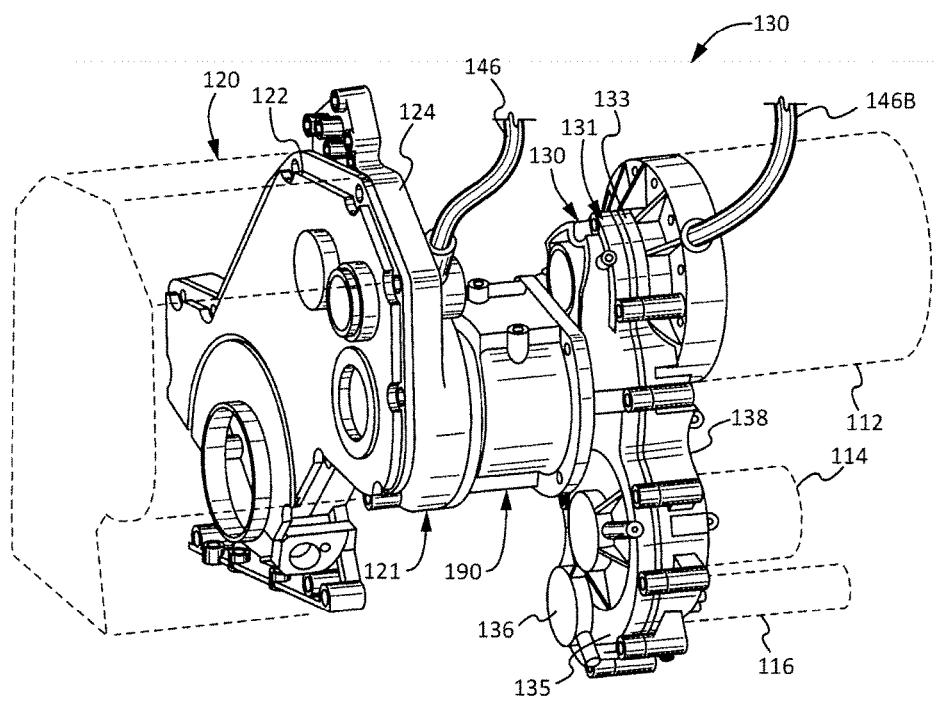
FIG. 3 is a perspective view of an internal combustion engine system having an electric accessory drive operatively coupled to an internal combustion engine via a clutch device in accordance with yet another embodiment.

FIG. 1 depicts one embodiment of an internal combustion engine system 10. The main components of the engine system 10 include an internal combustion engine 20 and a lubricated component 30. The internal combustion engine 20 can be a compression-ignited internal combustion engine, such as a diesel fueled engine, or a spark-ignited internal combustion engine, such as a gasoline fueled engine. The lubricated component 30 can be any of various devices, systems, or sub-systems that utilize or require lubrication for proper operation. For example, the lubricated component 30 can one or more of gear trains, fuel pumps, lubrication pumps, air compressors, valve systems, camshaft systems, and/or other components and systems that use lubrication to reduce friction and parasitic losses during operation. The lubricated component 30 can be directly or indirectly driven or powered by the engine 20 or associated components of the engine. For example, in one implementation, the lubricated component 32 is an electric accessory drive with a gear train that is mechanically driven by the engine via geared engagement with a drive gear of the engine. The geared engagement (e.g., mechanical coupling) may be facilitated by a clutch device that is selectively operable to engage and disengage the gear train of the lubricated component 32 and the drive gear of the engine 20 (see, e.g., FIG. 3).

The internal combustion engine system 10 also includes a lubricant supply system 12 that supplies lubricant to one or both of the internal combustion engine 20 and lubricated component 30. The lubricant supply system 12 includes a lubricant source 40 that stores or retains a quantity of lubricant sufficient to lubricate the system 10. In some implementation, the lubricant is oil and the lubricant source 40 is an oil pan or main oil sump. The lubricant supply system 12 further includes a pump 50 in lubricant receiving communication with the lubricant source 40. When actuated, the pump 50 is operable to suck or pull lubricant from the source via a lubricant conduit 44, and push or pump the lubricant to the internal combustion engine 20 and/or lubricated component 30 via one or more lubricant conduits 46. The pumping action of the pump 50 compresses the lubricant received from the lubrication source 40, which is at ambient pressure, such that the lubricant flowing through the lubricant conduits 46 into the engine 20 and lubricated component 30 is pressurized lubricant at a pressure about ambient pressure. The pressurized lubricant received by the engine 20 can be used to lubricate any of various lubricated systems and sub-systems of the engine 20. Similarly, the pressurized lubricant received by the lubricated component 30 is used to lubricate sub-components of the lubricated component.

Generally, after lubricating the sub-systems of the engine 20, lubrication supplied to the internal combustion engine 20 eventually drains from engine back into the lubrication source 40 via a drain conduit 42. In certain implementations, the drain conduit 42 can be an unmetered opening such that the flow of lubrication from the engine 20 is not regulated or controlled. In yet other implementations, the release of lubrication from the engine 20 is controlled in the same or similar manner as the lubricated component as will be described in more detail below. In certain implementations, the lubrication is supplied to the engine 20 at an upper portion of the engine and gravity fed down through the sub-systems of the engine until is drains from the engine at a lower portion where the drain conduit 42 is located.

In a manner similar to the engine 20, in certain implementations, after being supplied to the lubricated component 30 near an upper portion of the lubricated component, the lubrication is gravity fed down through the sub-components (e.g., gears) of the lubricated component. As the lubrication flows downwardly within the lubricated component, some lubrication covers or coats the sub-components, with the remaining lubrication 32 flow down to a lower portion of the lubrication component. The lower portion of the lubrication component may act as a local sump to retain a portion of the lubrication within the lubricated component even when the engine system 10 is not in operation.

The internal combustion engine system 10 also includes a lubricant flow regulation device 60 in lubrication receiving communication with the lubricated component 30. The lubrication 32 flows from the lubricated component 30 to the lubricant flow regulation device 60 via lubricant conduit 33, and the lubrication flows from the lubricant flow regulation device 60 to the lubricant source 40 via lubricant conduit 34. Generally, the lubricant flow regulation device 60 is configured to controllably release or drain lubrication 32 from the lubricated component 30 back to the lubrication source 40. More specifically, the lubricant flow regulation device 60 is operable to allow lubricant to continuously drain from the lubricated component 30 to the lubricant source 40 during at least most of the operation of the lubricated component 30 (e.g., while driven by the engine 20) and/or the engine system 10 (e.g., while the internal combustion engine 20 is running). The lubricant flow regulation device 60 is further configured to restrict the flow of lubricant 32 from the lubricated component 30 during at least most of the time the lubricated component 30 and/or the engine system 10 are not in operation.

Additionally, the lubrication flow regulation device 60 is operable and/or the lubricated component 30 is designed to ensure a certain quantity of lubricant 32 remains in the bottom portion of the lubricated component while the engine system 10 is not operating or is shut-down. For example, referring to FIG. 1, a portion of the lubricant 32 is shown collected in a bottom portion of the lubricated component 30. As mentioned above, after the engine 20 is turned off, the pump 50 ceases to pump lubricant through the lubricant supply system 12 such that any lubricant in the system 12 when the engine is turned off drains back into the lubricant source 40. When the engine 20 is turned on, the pump 50 pumps lubricant back into the lubricant supply system 12, but because the lubricant conduits of the lubricant system 12 are empty, a delay is experienced before lubricant reaches the lubricated component 30. The delay can be significant especially after cold start-ups when the lubricant is cold and particularly viscous.

To avoid the negative consequences of delaying lubricant to the lubricated component 30 after start-up of the engine 20, the surplus of lubricant 32 retained in the lubricated component 30, while the engine 20 is not operating, is available for distribution to the sub-components of the lubricated component upon start-up of the engine 20. More specifically, while the lubricant supply system 12 is being primed to deliver lubricant to the lubricated component 30 after start-up of the engine 20, the locally stored lubricant in the lubricated component 30 is immediately being distributed (e.g., splashed) onto the sub-components of the lubricated component via actuation, proximity, and interconnectivity of the sub-components. Accordingly, following start-up of the engine 10, lubricant 32 stored in the lubricated component 30 immediately begins to lubricate the sub-components while lubricant from the lubricant supply system 12 is delayed.

According to the embodiment of FIG. 1, the flow regulation device 60 is in lubricant receiving communication with the pump 50 via a lubricant conduit 48 such that the pump supplies lubricant to the flow regulation device when the system 10 is operating. The flow regulation device 60 can be fluidly coupled to the lubricant conduit 46 in some implementations, or other conduits containing pressurized lubricant from the pump 50. The flow regulation device 60 can be a pressure-regulated valve that opens when a predetermined pressure is applied to the valve. In one implementation, the flow regulation device 60 is biased in a closed configuration to prevent the flow of lubricant from the lubricated component 30 to the lubrication source 40. However, once pressurized lubricant from the pump 50 is supplied to the flow regulation device 60, and the pressurized lubricant reaches or excess a threshold pressure, the pressure of the lubricant opens the device to allow the flow of lubricant from the lubricated component 30 to the lubrication source 40. The threshold pressure can be associated with a complete pressurization of the lubricant delivery system 12.

Accordingly, when the engine 20 is off, lubricant ceases to flow into the lubricated component 30 and the flow regulation device 60 is closed to prevent lubricant from draining from the lubricated component. In this manner, any lubricant stored in the lubricated component 30 remains in the lubricated component and is available when the engine 20 is started to immediately lubricate the lubricated component. When the engine 20 is turned on, and the lubricant supply system 12 is fully pressurized with lubricant, not only does lubrication start to flow into the lubricated component 30 via the lubricant supply system, but the flow regulation device 60 is opened to allow lubricant to flow from the lubricated component to ensure that lubricant does not overfill the lubricated component.

Figure 2:
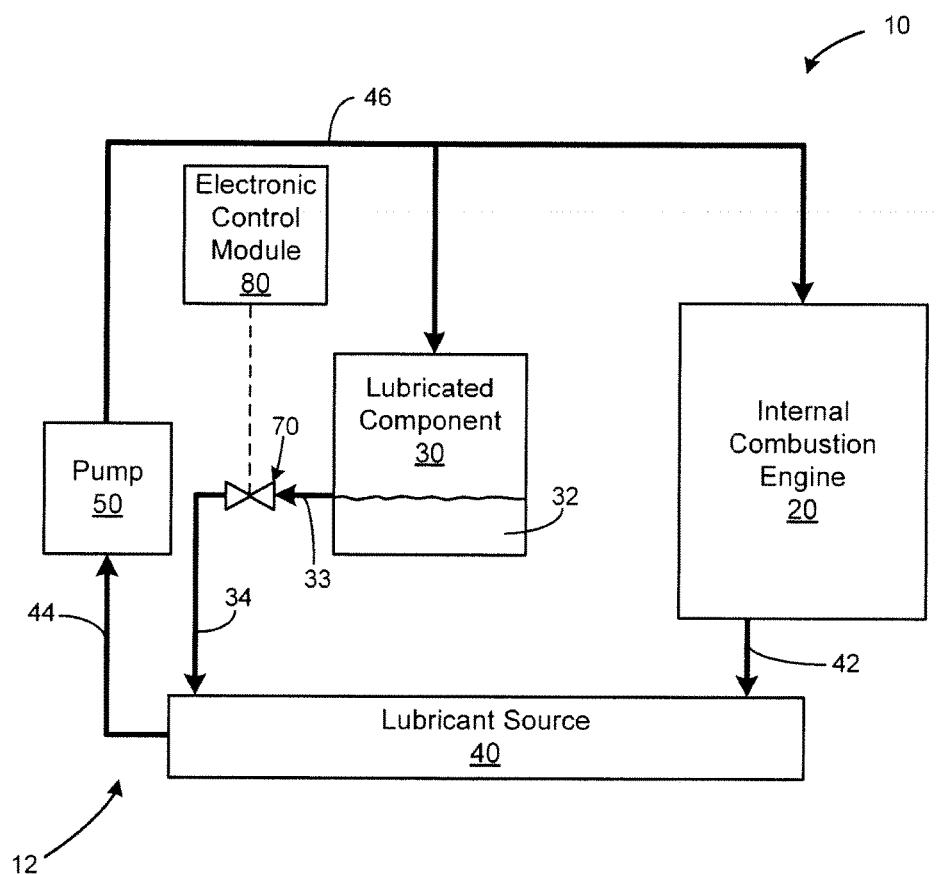
FIG. 2 is a schematic block diagram of an internal combustion engine system having an internal combustion engine, a geared component, and a lubrication supply system with an electrically-driven valve in accordance with one representative embodiment.

Referring to FIG. 2, the internal combustion engine system 10 can use a different lubricant flow regulation device 70 to control the release of the lubricant 32 from the lubricated component 30. The lubricant flow regulation device 70 is in lubricant receiving communication with the lubricated component 30 and lubricant providing communication with the lubricant source 40 via the lubricant conduits 33, 34 in the same manner as the lubricant flow regulation device 60. However, the lubricant flow regulation device 70 is not actuated based on pressurized lubricant received from the pump 50. Rather, the lubricant flow regulation device 70 is actuated in response to commands received from an electronic control module 80. For example, the lubricant flow regulation device 70 can be a solenoid-driven valve that is actuated upon receiving an electric pulse from the electronic control module 80. In one implementation, the electronic control module 80 is configured to open the lubricant flow regulation device 70 approximately when the engine 20 has started and close the device approximately when the engine has stopped. In yet one implementation, the electronic control module 80 opens the device 70 when a sensed or detected pressure of the lubricant in the system exceeds a threshold pressure.

Although the lubricant flow regulation devices 60, 70 have been described as a pressure-regulated valve and solenoid-driven valve, respectively, other types of valves that are controlled in any of the same or other manners can be used without departing from the essence of this disclosure. For example, in some implementations, a flapper-controlled valve can be used that is actuated via lubricant being expelled from a moving component of the engine system, such as a sub-component of the lubricated component.

Additionally, although the above embodiments have described lubricant flow regulation devices that open concurrently with the full pressurization of the lubricant supply system 12 after the engine 20 is turned on and close concurrently as soon as any pressure is lost in the lubricant supply system 12 after the engine is turned off, in some embodiments, the timing of the actuation of the lubricant flow regulation devices between opening and closing can be accelerated or delayed to affect the level of lubricant left in the local sump of the lubricated component 30. For example, the lubricant flow regulation devices 60, 70 can be designed to actuate at relatively lower oil pressures (e.g., lower percentages of the full, high-speed engine operation rifle pressure). In such implementations, the lubricant flow regulation devices 60, 70 will open early (e.g., before the lubricant supply system 12 is fully pressurized) after starting up the engine and will close late (e.g., after the lubricant supply system experiences depressurization) after the engine stops. Such a configuration will result in a relatively smaller amount of static lubricant 32 left in the local sump of the lubricated component 30.

According to the embodiment of FIG. 1, a lubricant outlet of the lubricated component 30 is positioned above a lowermost point of the lubricated component. However, in some embodiments, the lubricant outlet of the lubricated component 30 can be positioned at or nearer the lowermost point of the lubricated component. In such embodiments, the timing of the actuation of the lubricant flow regulation device can be controlled to close early before engine shutdown (e.g., before lubricant supply to the lubricated component 30 has stopped) to ensure an adequate amount of lubricant 32 has accumulated in the local sump of the lubricated component, and open late after engine start-up to ensure the accumulated lubricant 32 in the local sump is available for distribution to the sub-components of the lubricated component before the lubricant flow regulation device opens to allow lubricant to drain from the lubricated component.

Referring to FIGS. 3-6, one embodiment is shown of an internal combustion engine system 110 having a pressure-regulated valve 164 integrated into (e.g., forms a one-piece monolithic construction with) the housing 131 of an electric accessory drive 130 to control the flow of lubricant 140 from the electric accessory drive back to a lubricant source. In one specific implementation, the lubricant 140 is oil, but can be other lubricants as desired. The internal combustion engine system 110 includes an internal combustion engine 120 shown partially in dashed lines. The engine 120 includes a drive gear assembly housed within a gear housing 121 of the engine. The housing 121 includes two portions 122, 124 that are coupled together about one or more drive gears of the engine 120 to effectively enclose the drive gears within an interior 123 of the housing 121 and retain them in place within the housing. The drive gears can be driven by a drive shaft of the engine that rotates during operation of the engine. The engine system 110 includes a lubricant supply system that supplies lubricant to the gears in the gear housing 121 via a fluid conduit 146A.

Figure 5:
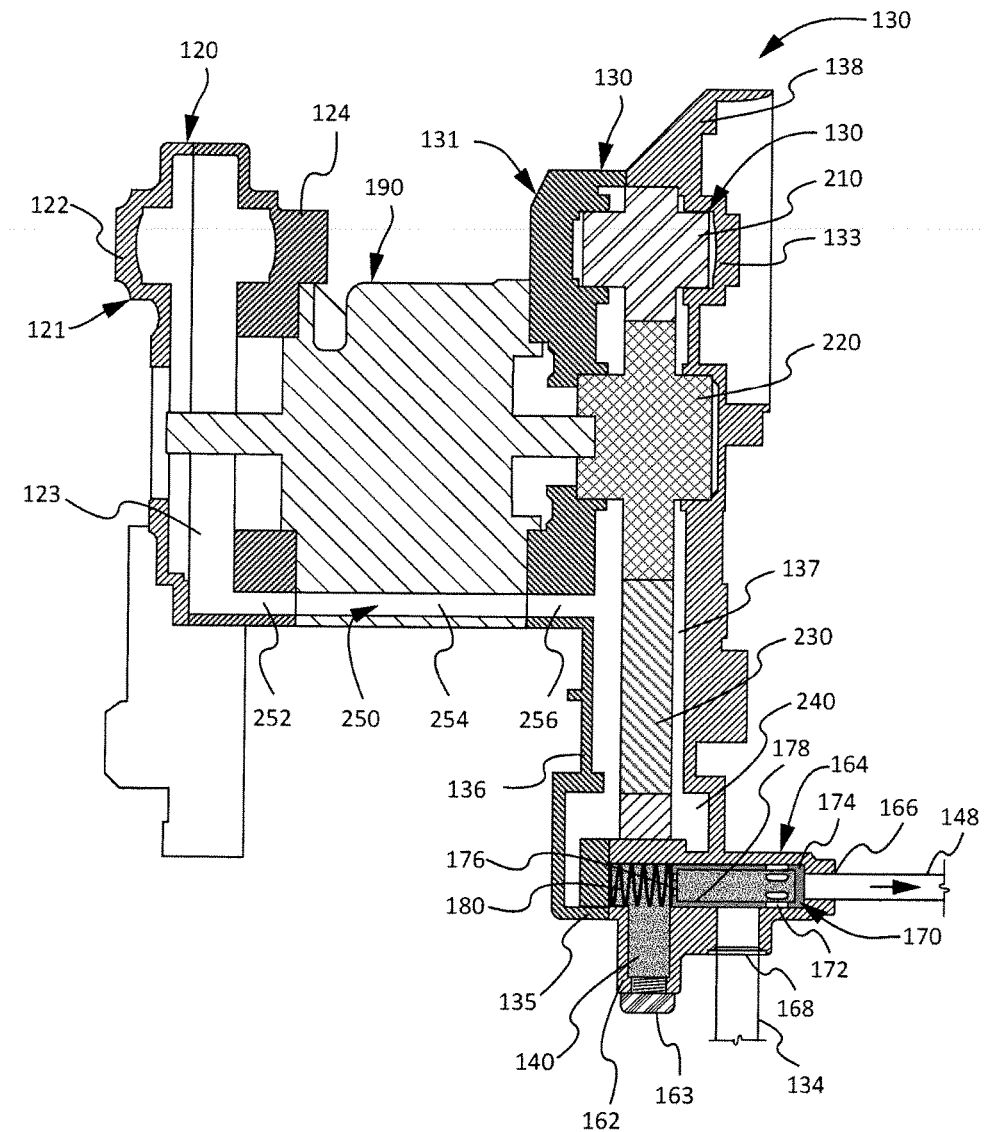
FIG. 5 is a cross-sectional side view of an internal combustion engine system with an electric accessory drive operatively coupled to an internal combustion engine via a clutch device shown with a lubricant-driven valve of the electric accessory drive being in a closed position in accordance one embodiment.

The housing 131 of the electric accessory drive 130 includes two portions 136, 138 that are coupled together about the gears 210, 220, 230, 240 of a gear train 208 to effectively enclose the gears within an interior 137 of the housing and retain them in place within the housing (see, e.g., FIG. 5). The electric accessory drive 130 receives lubricant from the lubricant supply system of the engine system 110 via a fluid conduit 146B. The fluid conduit 146B is coupled to an upper portion 133 of the housing 131 to supply lubricant into the housing at the upper portion. The lubricant flows onto the gears of the gear train 208 as the lubricant is gravity fed downwardly from the upper portion 133 to a lower portion 135, as well as when the lubricant is splashed from one gear to another. In some implementations, a lubricant flow channel with access to each of the gears and bearings can be formed (e.g., cast) into one or both of the portions 136, 138 of the housing 131 to facilitate the relatively uniform transfer of lubricant from the fluid conduit 146B onto each of the gears and associated bearings.

The engine system 110 also includes a clutch device 190 mounted between the engine 120 and the electric accessory drive 130. More specifically, one end of the clutch device 190 is mounted to the gear housing 121 of the engine 120 and the opposing end of the clutch device is mounted to the gear housing 131 of the electric accessory drive 130. Generally, the clutch device 190 is selectively activated to co-rotatably couple a drive gear within the gear housing 121 of the engine 120 to a driven gear (e.g., gear 210) of the gear train 208 within the housing. Accordingly, the effect of activating the clutch device is that the drive gear is able to drive the driven gear and transfer torque to the driven gear. When the clutch device 190 is not activated, the drive gear rotates relative to the driven gear such that the drive gear does not drive the driven gear and torque is not transferred between the drive and driven gears. Alternatively, depending on the configuration of the clutch device 190, the clutch device can be selectively activated to decouple the drive and driven gears and deactivated to couple the drive and driven gears. The clutch device 190 can be an electric clutch activated according to commands generated by an engine control module.

The gears 210, 230, 240 of the electric accessory drive 130 are configured to drive respective accessories 112, 114, 116 mounted to the electric accessory drive. The accessories 112, 114, 116 can be any of various accessories configured to convert torque or rotational power into electrical power for electrically powering the respective accessory. For example, in some implementations, the accessories can include any of various pumps, compressors, convertors, and the like [Inventors: Other accessories?]. Alternatively, the electric accessory drive 130 can simply transfer torque or rotational power to a rotatable mechanical device for actuating the device.

Figure 4:
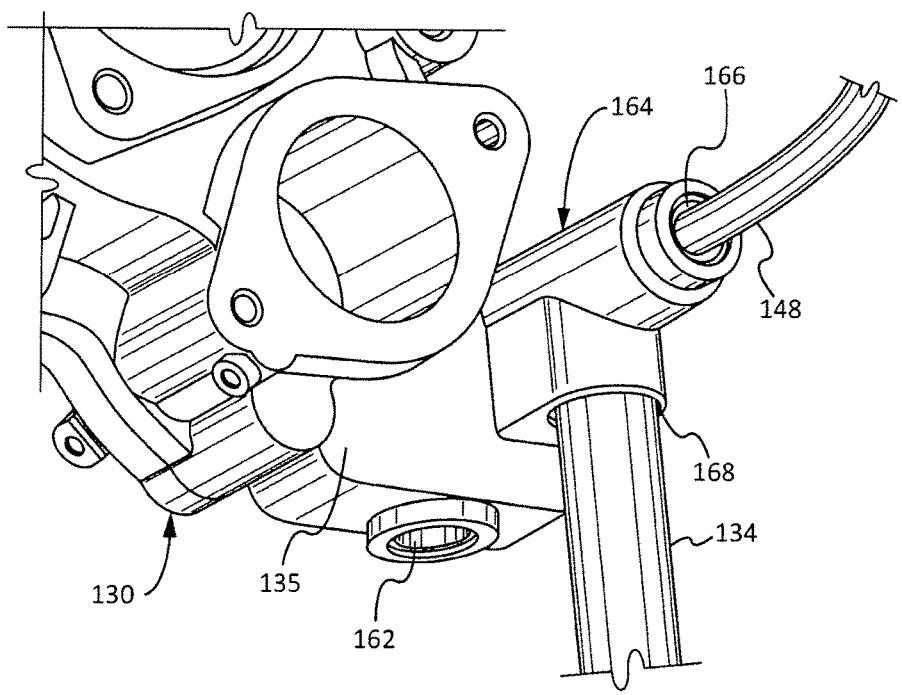
FIG. 4 is a perspective view of a lubricant-driven valve of an electric accessory drive in accordance with another embodiment.

Referring to FIG. 4, the pressure-regulated valve 164 is formed (e.g., cast) in the lower portion 135 of second portion 138 of the electric accessory drive housing 131. Accordingly, in some embodiments, the pressure-regulated valve 164 forms a one-piece monolithic construction with the housing 131. In other embodiments, the pressure-regulated valve can be attached, mounted, or coupled to the second portion 138, first portion 136, and/or other portion of the housing 131 as desired. The pressure-regulated valve 164 includes a lubricant supply inlet 166 and a lubricant return outlet 168. The lubricant supply inlet 166 and return outlet 168 may be coupled to respective lubricant conduits 148, 134 for receiving and returning lubricant. The lubricant conduit 148 is fluidly coupled to a lubricant pump of a lubricant supply system of the engine system 110, and the lubricant conduit 134 is fluidly coupled to a lubricant source or reservoir. The electric accessory drive 130 also includes a lubricant service outlet 162 with a removable cap or plug 163. The service outlet 162 is open to the interior 137 of the housing 131 and can be manually opened by removing the plug 163 to manually drain the lubricant from the electric accessory drive 130 during periodic service operations. The service outlet 162 remains plugged during regular operation of the engine system 110.

Figure 6:
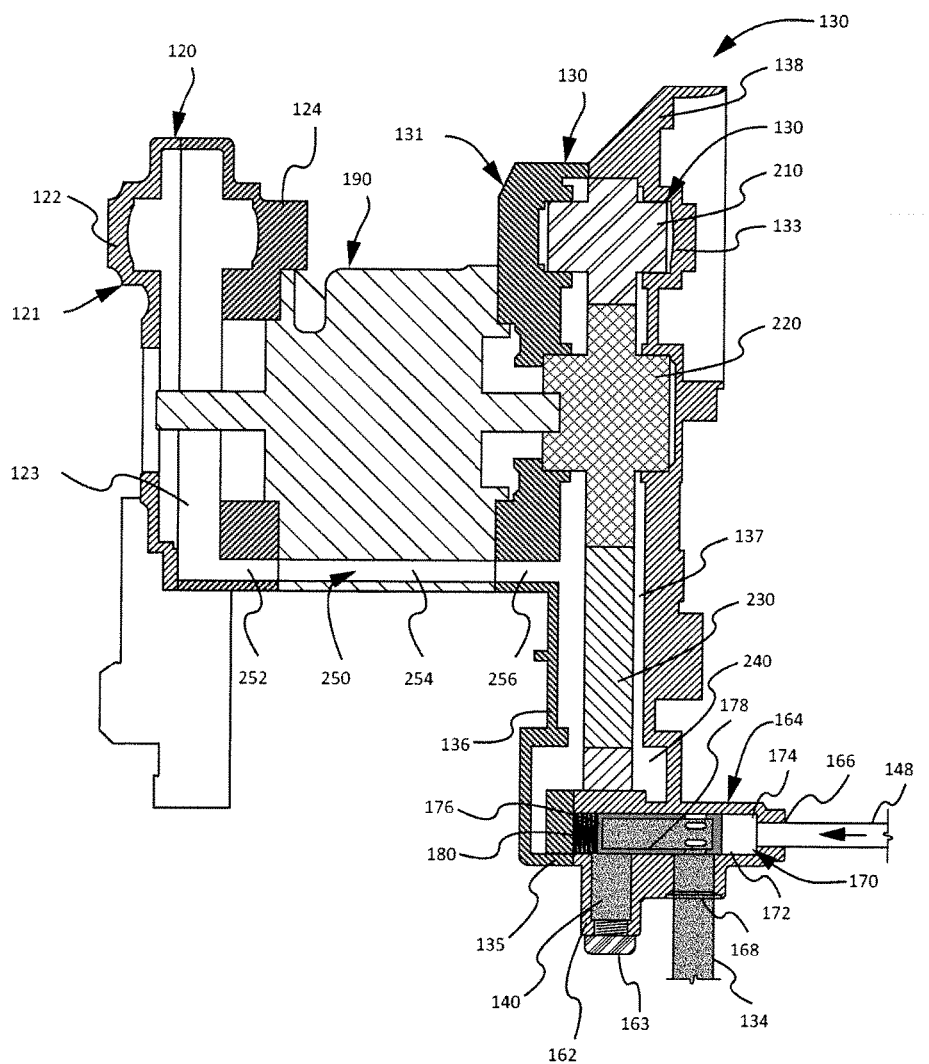
FIG. 6 is a cross-sectional side view of the internal combustion engine system of FIG. 5 shown with the lubricant-driven valve of the electric accessory drive being in an open position in accordance one embodiment.

As shown in FIGS. 5 and 6, the pressure-regulated valve 164 includes an interior channel 178 defined as a bore extending between the lubricant supply inlet 166 and the interior 137 of the housing 131. The interior channel 178 is defined within a body of the valve 164 coupled to the housing 131. The service outlet 162 and return outlet 168 are open to and extend from the interior channel 178 of the valve 164. In this manner, lubrication 140 in the interior 137 of the housing is flowable into the interior channel 178, and from the interior channel the lubrication is flowable into the service outlet 162 and lubricant return outlet 168 (e.g., when the valve is open).

The pressure-regulated valve 164 includes a piston 170 and a biasing element 180 positioned within the interior channel 178. The biasing element 180 biases the piston 170, which is linearly movable along a central axis of the interior channel 178, in a closed position within the interior channel as shown in FIG. 5. The biasing element 180 can be any of various biasing elements known in the art, such as the compression spring depicted in FIGS. 5 and 6. The biasing element is positioned within the interior channel 178 between the piston 170 and an interior end of the channel, and biases the piston against an exterior end of the channel proximate the lubricant supply inlet 166.

The piston 170 has a generally hollow, cylindrical shape with a fully closed end 174 opposing a partially open end 176. The circular outer surface of the piston forms a relatively tight fit with the circular inner surface of the interior channel 178 such that lubricant is obstructed from passing between the outer surface of the piston and the inner surface of the interior channel. The fully closed end 174 faces and plugs the lubricant supply inlet 166, and the partially open end 176 is partially open to the interior 137 of the housing 131. The partially open end 176 may have one or a plurality of openings through which lubricant is allowed to flow, but also has enough closed surface area to support the pressure from and contact with the biasing element 180. The piston 170 also includes a plurality of outlet apertures 172 formed in the sidewall of the piston between the fully closed end 174 and the partially open end 176. The apertures 172 are sized and shaped to allow lubricant 140 in the interior channel 178 to flow into the return outlet 168 when at least a portion of one aperture 172 is aligned with the return outlet. The piston 170 in the illustrated embodiment includes multiple apertures 172 spaced circumferentially about the sidewall of the piston to accommodate the possibility of rotation of the piston 170 within the interior channel 178. However, in some implementations, detents or stops may be integrated such that the piston 170 does not experience rotation within the interior channel, such that only a single outlet aperture 172 is necessary.

In operation, as shown in FIG. 5, with the engine 120 and engine system 110 turned off, the lubricant pump of the lubricant supply system is not pumping pressurized lubricant into the lubricant conduit 148 and lubricant supply inlet 166 of the valve 164. Without lubricant pressure applied against the fully closed end 174 of the piston 170 to overcome the bias of the biasing element 180, the bias of the biasing element 180 urges the piston in the direction indicated in FIG. 5 until it contacts a stop integrated into the interior channel 178 proximate the supply inlet 166. In this closed position of the valve 164, the apertures 172 are not aligned with the lubricant return outlet 168 and a sidewall of the piston covers the return outlet to prevent the flow of lubricant 140 into the return outlet. However, as shown in FIG. 6, when the engine 120 and engine system 110 is turned on, and the lubricant pump sufficiently pressurizes the lubricant in the lubricant conduit 148, the pressure of the lubricant applied against the fully closed end 174 overcomes the bias of the biasing element 180 (e.g., compresses the spring) to urge the piston in the direction indicated in FIG. 6. The bias of the biasing element 180 can be selectively chosen to correspond with a desired pressure threshold. In other words, the biasing element 180 can be configured to provide a desired bias associated with the pressure at which the valve 164 should open.

As the piston 170 moves in this opening direction, one or more of the apertures 172 becomes open to or at least partially aligns with the return outlet 168. In this open position, lubricant 140 in the interior 137 of the housing 131 and the interior channel 178 of the valve 164 is allowed to flow into the return outlet 168 and back to the lubricant reservoir. In this manner, the valve 164 prevents lubricant 140 from draining from the electric accessory drive 130 when the engine system 110 is off and allows lubricant to drain from the accessory drive when the engine system is on. In some implementations, when the engine system 110 is turned off and the valve 164 is closed, residual lubricant in the lubricant supply system bleeds into the interior 137 of the housing 131, which adds to the static lubricant stored in the local sump of the housing while the engine system is off.

According to some embodiments, the engine system 110 includes a drain or secondary drain 250 designed to drain lubricant from the lubricated component, such as the electric accessory drive 130, should the valve 164 get stuck in the closed position during operation of the engine system. The secondary drain 250 is a flow-through conduit extending from the interior 137 of the electric accessory drive 130, through the clutch device 190, to the interior 123 of the engine housing 121. The inlet end of the secondary drain 250 is open to the interior 137 at a location above the valve 164. In the illustrated embodiment, alignable, separate portions 252, 254, 256 of the secondary drain 250 can be formed in the engine housing 121, clutch device 190, and drive housing 131, respectively. The portions 252, 254, 256 of the secondary drain 250 are aligned to form the secondary drain 250 when the drive housing 131 and engine housing 121 are coupled to the clutch device 190. Should the valve 164 get stuck in the closed position during operation, lubricant will continuously accumulate and rise in the drive housing 131 until it reaches and drains into the inlet of the secondary drain 250. Without the secondary drain 250, the lubricant would continuously accumulate in the drive housing 131, which may result in an over-pressurization within the housing 131 and damage to the seals of the housing.

Although the valves 60, 70 of the present disclosure are configure to open to allow draining from the lubricated component when the pressure exceeds a threshold pressure, in some implementations, the valves may be configured to close when the pressure exceeds the threshold pressure, such as when the lubricated component is a torque convertor or other similar device.

The schematic flow chart diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An internal combustion engine system, comprising: a lubricated component comprising an electric accessory drive; a lubricant flow regulation device; a lubricant pump that selectively provides lubricant, a first portion of the lubricant directed to the lubricated component through a first conduit and a second portion of the lubricant directed to the lubricant flow regulation device through a second conduit, wherein the first portion of the lubricant does not go through the lubricant flow regulation device; a lubricant source in lubricant providing communication with the lubricant pump and in lubricant receiving communication with the lubricant flow regulation device;

a secondary drain extending from the interior of the electric accessory drive to an interior housing of the internal combustion engine system, the secondary drain configured to drain extra lubricant within the second conduit that does not drain through the lubricant regulation device; wherein the lubricant flow regulation device is configured to: responsive to a first command from an electronic control module responsive to the lubricant pump providing the second portion of the lubricant through the second conduit, drain lubricant from the lubricated component to the lubricant source; and responsive to a second command from the electronic control module responsive to the lubricant pump stopping providing the second portion of the lubricant through the second conduit, prevent drainage of lubricant from the lubricated component to the lubricant source.

2. The internal combustion engine system of claim 1, wherein the first command is independent of pressurization of the lubricant.

3. The internal combustion engine system of claim 2, wherein the second command is independent of pressurization of the lubricant.

4. The internal combustion engine system of claim 3, wherein the lubricant flow regulation device comprises a solenoid-driven valve.

5. The internal combustion engine system of claim 3, wherein the lubricant flow regulation device comprises a flapper-controlled valve.

6. A system, comprising: an internal combustion engine comprising a drive gear; a clutch device operatively coupled to the drive gear; an electric accessory drive operatively coupled to the clutch device via a driven gear of the electric accessory drive, wherein the clutch device is selectively operable to mechanically couple the drive gear and the driven gear and mechanically decouple the drive gear and the driven gear; a lubricant pump operable to supply lubricant to the internal combustion engine and the electric accessory drive to lubricate the drive gear and driven gear, respectively; and a pressure-regulated valve in lubricant receiving communication with the lubricant pump, wherein lubricant from the pump opens the pressure-regulated valve to drain lubricant from the electric accessory drive when a pressure of the lubricant meets a threshold pressure and closes the pressure-regulated valve to prevent drainage of lubricant from the electric accessory drive when the pressure of the lubricant does not meet the threshold pressure, wherein when at least a portion of lubricant from the electric accessory drive is not drained through the pressure-regulated valve, the at least a portion of lubricant is drained through a secondary drain formed by the alignment between the clutch device, the electric accessory drive, and a drive housing of the internal combustion engine.

7. The system of claim 6, further comprising a drain formed in the internal combustion engine, clutch device, and electric accessory drive, the drain fluidly coupling the internal combustion engine, clutch device, and electric accessory drive at a location above the pressure-regulated valve.

8. A method for lubricating a lubricated component in an internal combustion engine system, comprising: pumping, by a lubricant pump, a first portion of lubricant into a lubricated component through one or more conduits, wherein the lubricant pump and the lubricated component are in direct communication through the one or more conduits, wherein the lubricated component comprises an electric accessory drive; pumping, by the lubricant pump, a second portion of the lubricant into a pressure-regulated valve to open the pressure-regulated valve, the pressure-regulated valve being fluidly coupled to the lubricated component, wherein the first portion of lubricant does not go through the pressure-regulated valve; draining lubricant from the lubricated component through the opened pressure-regulated valve; draining lubricant from the electric accessory drive through a secondary drain when the pressure-regulated valve does not open after the second portion of the lubricant being pumped into the pressure-regulated valve, the secondary drain extending from the interior of the electric accessory drive to the interior of the internal combustion engine system; and closing the pressure-regulated valve so as to prevent lubricant from draining from the lubricated component in response to an engine of the internal engine system being shut down.

9. The method of claim 8, further comprising opening the pressure-regulated valve so as to allow lubricant to flow from the lubricant component in response to the engine being turned on.

* * * * *